US010560501B2

(12) United States Patent
Kim (10) Patent No.: US 10,560,501 B2
(45) Date of Patent: Feb. 11, 2020

(54) METHOD AND APPARATUS FOR CLOUD STREAMING SERVICE

(71) Applicant: SK PLANET CO., LTD., Seongnam-si, Gyeonggi-Do (KR)

(72) Inventor: Dong-Gook Kim, Yongin-si (KR)

(73) Assignee: SK PLANET CO., LTD., Seongnam-si, Gyeonggi-Do (KR)

(*) Notice: Subject to any disclaimer, the term of this patent is extended or adjusted under 35 U.S.C. 154(b) by 178 days.

(21) Appl. No.: 15/812,429

(22) Filed: Nov. 14, 2017

(65) Prior Publication Data

US 2018/0139256 A1    May 17, 2018

(30) Foreign Application Priority Data

Nov. 17, 2016 (KR) .................. 10-2016-0153107

(51) Int. Cl.
*H04L 29/06* (2006.01)
*G06F 9/50* (2006.01)
(Continued)

(52) U.S. Cl.
CPC ........ *H04L 65/4069* (2013.01); *G06F 9/5072* (2013.01); *H04L 67/10* (2013.01);
(Continued)

(58) Field of Classification Search
CPC ............. G06F 3/04847; G06F 3/04842; G06F 3/04883; G06F 3/0482; G06F 3/017; G06F 3/0481; G06F 3/04815; G06F 3/0485; H04N 21/6587; H04N 21/47217; H04N 21/4532; H04N 21/4622; H04N 21/8455;
(Continued)

(56) References Cited

U.S. PATENT DOCUMENTS 8,315,977 B2 * 11/2012 Anand ............... G06F 16/273
707/610
8,365,235 B2 * 1/2013 Hunt ................... G06F 3/04817
725/88

(Continued)

FOREIGN PATENT DOCUMENTS

JP      2004-220260 A    8/2004
KR  10-2014-0106838 A    9/2014
(Continued)

OTHER PUBLICATIONS

Office Action dated Nov. 27, 2018 for Japanese Application No. 2017-220565, 6 pages.

(Continued)

*Primary Examiner* — Ninos Donabed
(74) *Attorney, Agent, or Firm* — Fenwick & West LLP (57) ABSTRACT

Provided are a method and apparatus for providing a cloud streaming service. A cloud streaming server efficiently manages server resources and supports a number of terminals which is greater than a number of browsers to be concurrently executed by assigning a browser only when an input is received from a terminal and streaming an execution result corresponding to the input to the terminal and storing an execution result according to the same input in the cloud streaming server, rather than by assigning browsers to terminals connected to the cloud streaming server.

11 Claims, 5 Drawing Sheets

(51) Int. Cl.
*H04L 29/08* (2006.01)
*H04N 21/40* (2011.01)

(52) U.S. Cl.
CPC .............. *H04L 65/60* (2013.01); *H04L 67/02* (2013.01); *H04N 21/40* (2013.01)

(58) Field of Classification Search
CPC ......... H04N 21/4122; H04N 21/44222; H04N 21/482; H04N 21/4825; H04N 9/8205; H04L 65/4084
See application file for complete search history.

(56) References Cited

U.S. PATENT DOCUMENTS

| | | | | |
|---|---|---|---|---|
| 9,374,619 | B2* | 6/2016 | Andreasen | H04N 21/4227 |
| 9,917,791 | B1* | 3/2018 | Goldfain | G06F 21/10 |
| 2004/0220791 | A1* | 11/2004 | Lamkin | G06F 21/10 |
| | | | | 703/11 |
| 2004/0220926 | A1* | 11/2004 | Lamkin | G06F 21/10 |
| 2008/0288722 | A1 | 11/2008 | Lecoq et al. | |
| 2009/0327404 | A1 | 12/2009 | Honein | |
| 2010/0042642 | A1* | 2/2010 | Shahraray | G11B 27/005 |
| | | | | 707/756 |
| 2011/0090953 | A1* | 4/2011 | Melnyk | H04N 21/85406 |
| | | | | 375/240.03 |
| 2012/0004040 | A1* | 1/2012 | Pereira | A63F 13/358 |
| | | | | 463/42 |
| 2012/0004041 | A1* | 1/2012 | Pereira | A63F 13/35 |
| | | | | 463/42 |
| 2012/0005316 | A1* | 1/2012 | Perry | H04L 65/4069 |
| | | | | 709/219 |
| 2013/0344960 | A1* | 12/2013 | Perry | A63F 13/12 |
| | | | | 463/32 |
| 2014/0179424 | A1* | 6/2014 | Perry | A63F 13/355 |
| | | | | 463/31 |
| 2014/0179440 | A1* | 6/2014 | Perry | A63F 13/803 |
| | | | | 463/42 |
| 2014/0282755 | A1* | 9/2014 | Alsina | H04N 21/6587 |
| | | | | 725/88 |
| 2017/0026443 | A1* | 1/2017 | Januszewski | H04L 43/0876 |
| 2017/0087460 | A1* | 3/2017 | Perry | A63F 13/35 |
| 2017/0180814 | A1* | 6/2017 | Stathacopoulos | H04N 21/4882 |
| 2017/0251257 | A1* | 8/2017 | OBrien | H04N 21/4622 |

FOREIGN PATENT DOCUMENTS

| | | |
|---|---|---|
| KR | 10-2016-0000911 A | 1/2016 |
| KR | 10-2016-0069443 | 6/2016 |
| KR | 10-2016-0097957 A | 8/2016 |
| KR | 10-2016-0102682 A | 8/2016 |
| KR | 10-2016-0102683 A | 8/2016 |
| KR | 10-2016/0131830 | 11/2016 |

OTHER PUBLICATIONS

Corresponding Office Action and partial translation to Korean Application No. 10-2016-0153107, dated May 31, 2018, 6 pages.
Extended European Search Report dated Apr. 13, 2018 for European Application No. 17202223.8, 33 pages.

* cited by examiner

METHOD AND APPARATUS FOR CLOUD STREAMING SERVICE

CROSS-REFERENCE TO RELATED APPLICATION

This application claims priority to and the benefit of Korean Patent Application No. 10-2016-0153107, filed in the Korean Intellectual Property Office on Nov. 17, 2016, the entire contents of which are incorporated herein by reference.

TECHNICAL FIELD

The present invention relates to a method and apparatus for a cloud streaming service, and more particularly, to a method and apparatus for a cloud streaming service, which are capable of efficiently managing resources of a cloud streaming server and increasing the number of terminal sessions to be concurrently serviced by assigning an application according to an input from a terminal to execute the input when a cloud streaming service is provided.

BACKGROUND

A description of this section simply provides background information regarding embodiments set forth herein and should not be understood to form the related art.

With the advancement of computer network technologies, an existing computing environment depending on independent hardware performance of each terminal has evolved into a form of cloud computing providing a service using all computing resources in a network according to a request from a terminal.

Cloud computing may be defined as an 'on-demand outsourcing service of computing resources', provided via an information communication network such as the Internet. In a cloud computing environment, a service provider provides users with desired services by integrating data centers dispersed over several locations through virtualization technology. A user of a service may select and use desired services in a virtual space generated through the virtualization technology at a desired time rather than installing and using computing resources in a terminal belonging to the user.

According to the cloud computing, a user may access a cloud network through a terminal capable of performing only a network access function and a basic arithmetic function to perform works which need a large-capacity storage device and high-performance computing resources and receive various services.

A cloud streaming service is a streaming service based on such a cloud computing environment, whereby a server may execute content using server resources, captures and encodes an execution result screen, and transmits the encoded execution result screen to a terminal, and the terminal may decode and display the encoded execution result screen. Thus, a user may use content requiring high-performance computing resources regardless of the specifications of the terminal.

Figure 1:
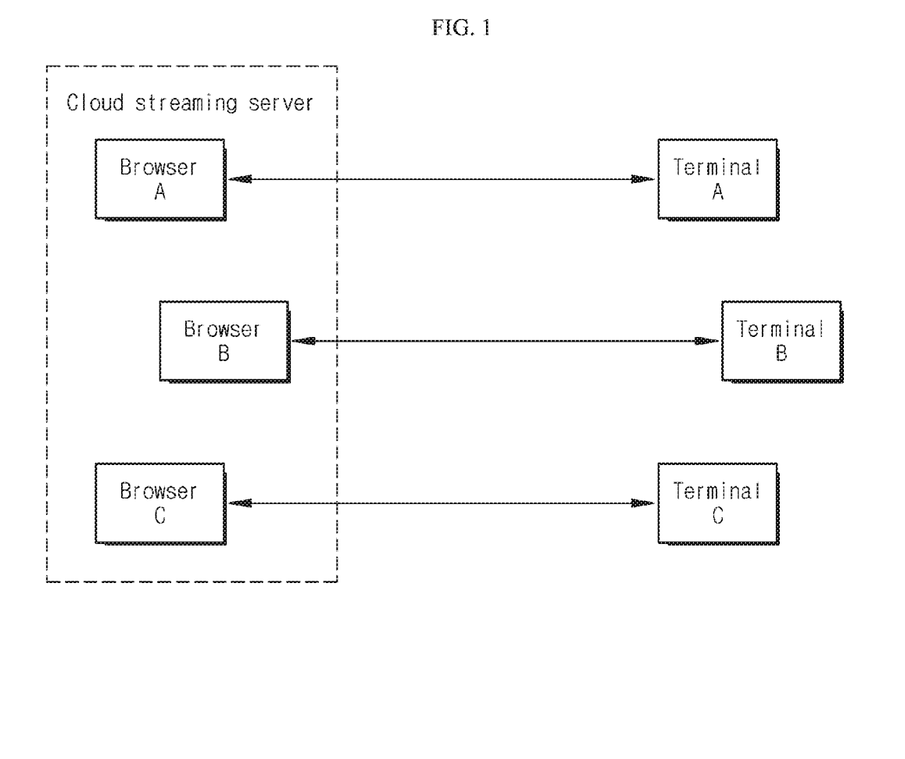
FIG. 1 is a diagram illustrating a browser assignment structure of a conventional cloud streaming system which provides a cloud computing-based web browsing service.

FIG. 1 is a diagram illustrating a browser assignment structure of a conventional cloud streaming system which provides a cloud computing-based web browsing service.

Referring to FIG. 1, the conventional cloud streaming system assigns one of browsers to each of terminals.

Each of the browsers displays a current screen of the terminal corresponding thereto. When an input is received from the terminal, the screen is changed as the input is transferred to the browser assigned to the terminal, and is rendered, captured, encoded, and transmitted to the terminal.

According to an existing method described above, even if the same screen is viewed by users of the respective terminals, different browsers are assigned to the users and thus the number of peak concurrent connected users which may be supported by the cloud streaming system is limited to the number of browsers to be concurrently executed. Thus, even if the same input is received from the terminals, an output screen corresponding to the input is rendered, captured, and encoded each time the input is received and thus consumption of server resources increases.

SUMMARY

The present invention is directed to supporting a number of terminals which is greater than the number of browsers to be concurrently executed by assigning an application according to an input from a terminal to execute the input and streaming an execution result corresponding to the input to the terminal, rather than assigning applications according to terminals connected to a cloud streaming server to execute inputs from the terminals.

The present invention is also directed to efficiently managing server resources by storing an execution result according to the same input in a cloud streaming server so that rendering, capturing, and encoding may not be repeatedly performed.

One aspect of the present invention provides a cloud streaming server including a controller configured to receive, from a terminal, latest-state information of an application to which input information is to be applied and the input information, assign the application and convert the application to a corresponding latest state by applying the latest-state information to the application, execute the application by applying the input information in the latest state, and control a result of execution of the application to be transmitted to the terminal.

The cloud streaming server may further include a storage unit configured to store the execution result by mapping the execution result to a combination of the latest-state information and the input information. Before the application is assigned, the controller may determine whether the execution result mapped to the latest-state information and the input information is stored in the storage unit, control the application to be assigned and executed by applying the latest-state information and the input information and the result of execution of the application to be stored in the storage unit and transmitted to the terminal when the execution result is not stored in the storage unit, and control the execution result to be transmitted to the terminal when the execution result is stored in the storage unit.

The cloud streaming server may further include a screen generator configured to execute the application by reflecting the input information into the latest state, and render, capture, and encode the result of execution of the application when the execution result is not stored in the storage unit, under control of the controller; and a transmitter configured to stream the execution result stored in the storage unit or the execution result encoded by the screen generator to the terminal, under control of the controller.

The application may include an application program of loading and executing a web document.

The controller may sequentially assign latest-state information and input information received from at least one terminal to at least one application.

The controller may assign an application for execution of the latest-state information and the input information among at least one application on the basis of the latest-state information.

The controller may assign a plurality of terminals to applications, and execute the applications by sequentially applying latest-state information and input information received from the plurality of terminals to the applications.

The latest-state information may include information regarding a uniform resource locator (URL) of a web document, and the input information may include a key value selected in the web document.

Another aspect of the present invention provides a method of providing a cloud streaming service, performed by a cloud streaming server, the method including receiving latest-state information of the application to which the input information is to be applied and the input information from the terminal; assigning an application for executing the latest-state information and the input information; converting the application to a corresponding latest state by applying the latest-state information to the application, and executing the application by applying the input information in the latest state; and streaming a result of execution of the application to the terminal.

The method may further include storing results of execution of for each application by mapping the execution result to a combination of latest-state information and input information.

Before the application is assigned, the method may further include determining whether the execution result mapped to the latest-state information and the input information is stored. The application may be assigned when it is determined that the execution result mapped to the latest-state information and the input information is not stored.

When it is determined that the execution result mapped to the latest-state information and the input information is not stored, the result of execution of the application may be stored and streamed to the terminal. When it is determined that the execution result mapped to the latest-state information and the input information is stored, the stored execution result may be streamed to the terminal.

The assigning of the application for executing the latest-state information and the input information may include sequentially assigning latest-state information and input information received from at least one terminal to at least one application.

The assigning of the application for executing the latest-state information and the input information may include assigning an application for executing the latest-state information and the input information among at least one application on the basis of the latest-state information.

The assigning of the application for executing the latest-state information and the input information may include arbitrarily assigning an application to sequentially apply and execute latest-state information and input information received from a plurality of terminals.

Another aspect of the present invention provides a non-transitory computer-readable recording medium having recorded thereon a computer program for executing the method described above.

Another aspect of the present invention provides a cloud streaming service system including a cloud streaming server configured to receive latest-state information and input information from a terminal, assign an application, convert the application to a corresponding latest state by applying the latest-state information to the application, execute the application by applying the input information in the latest state, and streaming a result of execution of the application to the terminal; and a terminal configured to transmit, to the cloud streaming server, input information and latest-state information of an application to which the input information is to be applied, receive an execution result according to the latest-state information and the input information from the cloud streaming server, and display the execution result.

According to the present invention, in a cloud streaming service providing a web browsing service, a number of terminal sessions to be concurrently supported may be increased by assigning a browser only when an input is received from a terminal, and server resources may be efficiently managed by storing an execution result according to the same input in a cloud streaming server to prevent rendering, capturing, and encoding from being repeatedly performed.

DETAILED DESCRIPTION

The present invention will be described in more detail with reference to exemplary embodiments thereof illustrated in the accompanying drawings so as to clearly describe features and advantages of the present invention.

In the following description and the appended drawings, a detailed description and illustration of well-known functions or constructions are skipped when it is determined that they would obscure the invention due to unnecessary detail. Throughout the drawings, the same elements are assigned the same reference numerals if possible.

It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Embodiments set forth herein and elements illustrated in the drawings are merely examples of the present invention and do not completely represent the technical idea of the invention. Thus, it should be understood that various equivalents and modified examples which may replace these embodiments would have been made at the filing date of the present application.

It will be understood that, although the terms first, second, etc., may be used herein to describe various elements, these elements should not be limited by these terms. These terms are only used to distinguish one element from another element.

It will be further understood that when an element is referred to as being 'coupled to' or 'connected to' another element, the element can be logically or physically connected to another element. In other words, the element may be coupled or connected directly to another element but intervening elements may be present or the element may be coupled or connected indirectly to another element.

The terminology used herein is for the purpose of describing particular embodiments only and is not intended to be limiting of the invention. As used herein, the singular forms 'a', 'an' and 'the' are intended to include the plural forms as well, unless the context clearly indicates otherwise.

A cloud streaming service system according to the present invention provides Software as a Service (SaaS), and includes at least one application, executes the at least one application according to an input received from a terminal, and provides a service of streaming a result of execution of the at least one application to the terminal.

In the present disclosure, the term "application" may be understood as, for example, an application program (e.g., a browser) for loading and executing a web document. Hereinafter, a case in which a web browser is serviced on the basis of cloud streaming will be described.

A method and apparatus for a cloud streaming service according to embodiments of the present invention will be described in detail with reference the accompanying drawings below.

Figure 2:
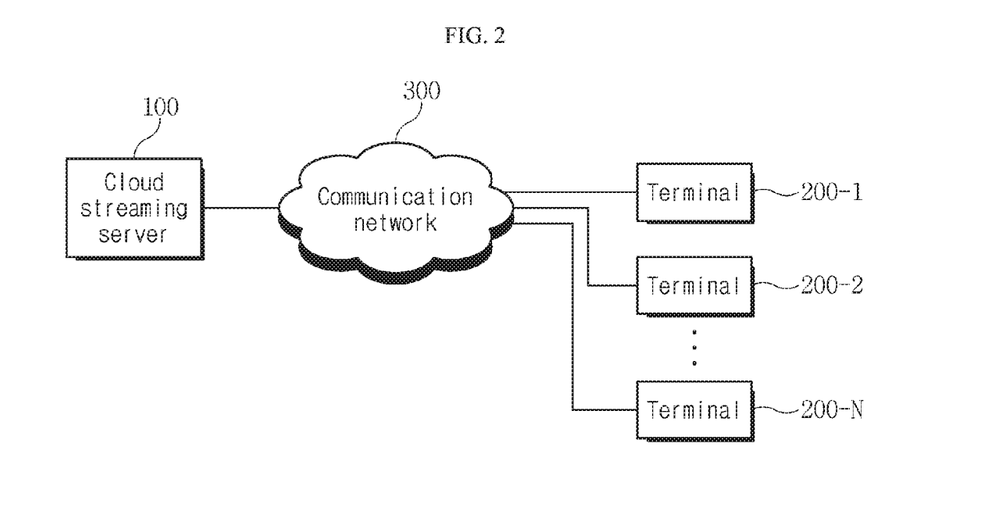
FIG. 2 is a diagram illustrating a cloud streaming service system according to an embodiment of the present invention.

FIG. 2 is a diagram illustrating a cloud streaming service system according to an embodiment of the present invention.

Referring to FIG. 2, the cloud streaming service system according to an embodiment of the present invention may include a cloud streaming server 100, a plurality of terminals 200-1 to 200-N, and a communication network 300 supporting exchange of information between the cloud streaming server 100 and the terminals 200-1 to 200-N.

These elements will be briefly described below. The terminal 200-1 according to an embodiment of the present invention should be understood as a user's device through which various data may be transmitted or received via the communication network 300 according to the user's manipulation.

The terminal 200-1 may access the cloud streaming server 100 via the communication network 300 to receive various types of information from the cloud streaming server 100 and transmit an input from a user to the cloud streaming server 100 according to a cloud streaming service method.

To this end, the terminal 200-1 according to an embodiment of the present invention may include a browser for transmission/reception of information, a memory for storing programs and protocols, a microprocessor for executing various programs to perform an arithmetic operation and a control operation, etc.

In particular, the terminal 200-1 according to an embodiment of the present invention may be connected to the cloud streaming server 100 via the communication network 300 to provide latest-state information of an application and input information so as to request execution of specific content and receive information which is a result of execution of the specific content from the cloud streaming server 100 according to a streaming method, so that a user of the terminal 200-1 may use the execution result.

The terminal 200-1 according to an embodiment of the present invention may basically include a function of receiving and decoding encoded streaming data and further include a function of outputting decoded data.

The terminal 200-1 according to an embodiment of the present invention may be embodied in various forms. For example, the terminal 200-1 described herein may be a mobile terminal such as a smart phone, a tablet personal computer (PC), a personal digital assistant (PDA), a portable multimedia player (PMP), or an MP3 player, or a fixed terminal such as a smart television (TV), a desktop computer, or a set-top box.

The terminal 200-1 according to an embodiment of the present invention may be classified as a device which has an outputting function or a device which does not have the outputting function. The device which does not have the outputting function may be connected to an output device (not shown), such as a TV, a monitor, or a projector, to transmit data to the output device, so that an execution result screen received from the cloud streaming server 100 according to the streaming method may be output via the output device.

In line with digital device convergence trends, portable devices have been variously modified and thus it is difficult to enumerate all of them, but any device capable of exchanging information with the cloud streaming server 100 via the communication network 300 and decoding and reproducing encoded data transmitted from the cloud streaming server 100 according to the streaming method may be employed as the terminal 200-1 according to an embodiment of the present invention.

The cloud streaming server 100 is configured to provide a cloud streaming service according to an embodiment of the present invention, and provides the terminal 200-1 with a service or a function requested by the terminal 200-1 through screen virtualization. Here, the term "screen virtualization" should be understood as implementing a screen for execution of specific content at a server, i.e., the cloud streaming server 100, connected to the terminal 200-1 via the communication network 300 and providing a result of implementing the screen to the terminal 200-1 as if the screen had been implemented at the terminal 200-1.

To this end, when latest-state information of an application to which information input from the terminal 200-1 is to be applied and the input information are received, the cloud streaming server 100 assigns the application, applies the latest-state information to the assigned application so as to change the application to be in a corresponding latest state, executes the application by applying the input information in the latest state, performs rendering, captures and encodes an execution result screen, and transmits the encoded execution result screen to the terminal 200-1 according to a streaming method.

In this case, the cloud streaming server 100 may store an execution result according to the latest-state information and the input information, so that rendering, capturing, and encoding may not be repeatedly performed for the same input.

In this case, when the execution result mapped to a combination of the latest-state information and the input information is stored, i.e., when the latest state and the encoded execution result screen are mapped and stored, before the application is assigned, the cloud streaming server 100 may transmit the stored execution result to the terminal 200-1 without assigning and executing the application. The application may be assigned and executed only when the execution result is not stored.

Here, the application may be an application program, e.g., a browser, of loading and executing a web document.

The latest-state information may be information regarding a uniform resource locator (URL) of the web document. The input information may be a key value selected in the web document.

The communication network 300 according to an embodiment of the present invention may use, but is not limited to, a wireless communication scheme such as a wireless local area network (WLAN), wireless fidelity (Wi-Fi), a wireless broadband (WiBro), worldwide interoperability for microwave access (WiMAX), or high-speed downlink packet access (HSDPA). According to a system implementation method, the communication network 300 may use a wired communication scheme such as Ethernet, an x-digital subscriber line (xDSL) such as an asymmetric DSL (ADSL) or very high-data rate DSL (VDSL), a hybrid fiber coaxial cable (HFC), a fiber-to-the curb (FTTC), or a fiber-to-the home (FTTH).

Furthermore, the communication network 300 according to an embodiment of the present invention may include, for example, a plurality of access networks (not shown), a core network (not shown), and an external network such as the Internet (not shown). Here, the access networks may establish wired/wireless communication with the terminals 200-1 to 200-N, and may be embodied as, for example, a plurality of base stations, including a base station (BS), a base transceiver station (BTS), a NodeB, an eNodeB, etc., and a BS controller, including a BS controller (BSC) or a radio network controller (RNC).

A digital signal processor and a radio signal processor formed integrally in each BS may be divided into a digital unit (hereinafter referred to as 'DU') and a radio unit (hereinafter referred to as 'RU'). A plurality of RUs (not shown) may be installed in a plurality of regions and connected to a concentrated DU (not shown).

The core network forms a mobile network together with the access networks, and connects the access networks to the external network, such as the Internet.

As described above, the core network is a network system performing major functions for mobile communication services, for example, mobility control and switching between the access networks, performs circuit switching or packet switching, and manages and controls a flow of packets in a mobile network. Furthermore, the core network may manage mobility between frequencies, control traffics in the access networks and the core network, and conduct connection to another network, e.g., the Internet. The core network may further include a serving gateway (SGW), a packet data network (PDN) gateway (PGW), a mobile switching center (MSC), a home location register (HLR), a mobile mobility entity (MME), a home subscriber server (HSS), etc.

The Internet means a general and public communication network via which information is exchanged according to the TCP/IP protocol, i.e., a public network. Through the Internet, information supplied from the cloud streaming server 100 may be provided to the terminal 200-1 via the core network and the access networks and information supplied from the terminal 200-1 may be provided to the cloud streaming server 100 via the access networks and the core network. However, embodiments are not limited thereto and the cloud streaming server 100 may be formed integrally with the core network.

All of communication methods which are well known or will be developed in the near future may be employed, as well as the communication method described above.

The cloud streaming server 100 according to an embodiment of the present invention has the same structure as a general web server or a network server, in terms of hardware. However, the cloud streaming server 100 includes a program module realized in language such as C, C++, Java, Visual Basic, or Visual C, in terms of software.

Alternatively, the cloud streaming server 100 according to an embodiment of the present invention may be embodied as dispersed computing systems in which a virtual machine (VM) is individually provided to a plurality of users from one super computer or at the same hardware platform at which several computers are connected to one another to be operated as one computer.

Figure 3:
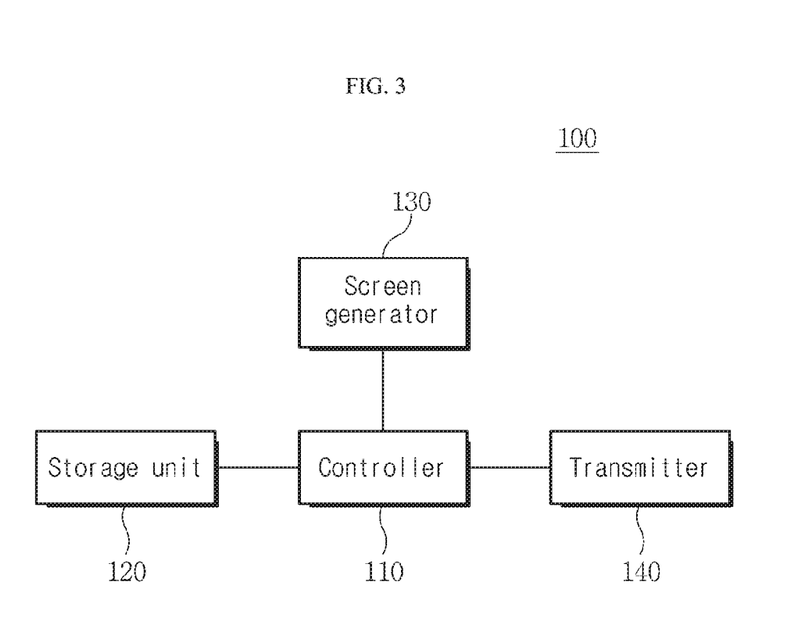
FIG. 3 is a block diagram of a cloud streaming server which provides a cloud streaming service according to an embodiment of the present invention.

FIG. 3 is a block diagram of a cloud streaming server 100 which provides a cloud streaming service according to an embodiment of the present invention.

Referring to FIG. 3, the cloud streaming server 100 according to an embodiment of the present invention may include a controller 110, a storage unit 120, a screen generator 130, and a transmitter 140.

The storage unit 120 is a device configured to store data, and may include a main memory device and an auxiliary memory device and store various commands for processing a cloud streaming service according to an embodiment of the present invention.

In particular, the storage unit 120 according to an embodiment of the present invention may map latest-state information and input information received from a terminal, and an execution result therefor to one another and store a combination of the latest-state information, the input information, and the execution result. The mapped and stored execution result should be understood as a screen generated by rendering, capturing and encoding state information regarding an execution result, which is obtained by applying the input information in a latest state in which the latest-state information is applied to an application, and the execution result in the application.

The storage unit 120 according to an embodiment of the present invention may be a cache memory which is a high-speed memory device.

The screen generator 130 generates a final result screen to be transmitted to the terminal 200-1 by rendering, in an application, a result of execution of the application to which latest-state information and the input information are applied, and capturing and encoding the result of rendering the execution result.

The transmitter 140 streams the result of execution of the application to which the latest-state information and the input information are applied to the terminal 200-1.

In this case, when an execution result mapped to the latest-state information and the input information is stored in the storage unit 120, the execution result is directly streamed to the terminal 200-1 but when the execution result is not stored in the storage unit 120, a screen generated by the screen generator 130 is streamed to the terminal 200-1, under control of the controller 110.

The controller 110 may be a processing device which drives an operating system (OS) and the elements of the cloud streaming server 100. In particular, the controller 110 according to an embodiment of the present invention controls overall operations of the cloud streaming server 100.

The controller 110 assigns an application only when a specific input is received from the terminals 200-1 to 200-N rather than assigning applications to the terminals 200-1 to 200-N.

In detail, when latest-state information and input information are received from the terminal 200-1, whether an execution result mapped to the latest-state information and the input information has been stored in the storage unit 120 is determined before an application is assigned.

When an execution result mapped to the latest-state information and the input information has been stored in the storage unit 120, the execution result is transmitted through the transmitter 140 according to a streaming method.

When an execution result mapped to the latest-state information and the input information has not been stored in the storage unit 120, an application is assigned, a latest state is loaded by applying the latest-state information to the application, and the application is executed by applying the input information thereto. A result of execution of the application is rendered, captured, and encoded by the screen generator 130 to generate a screen. Information regarding a state executed by applying the latest-state information and the input information, and data of the encoded screen are mapped as an execution result to the latest-state information and the input information received from the terminal 200-1 and are then stored in the storage unit 120. After the execution result is stored, it is transmitted through the transmitter 140 according to the streaming method.

Here, the application assigned by the cloud streaming server 100 is an application program, e.g., a browser, which loads and executes a web document. The latest-state information received from the terminal 200-1 may be a URL of the web document, and the input information may be a key value selected in the web document.

For example, when the cloud streaming server 100 receives 'URL=A and KEY=Right' from the terminal 200-1, the controller 110 determines whether an execution result has been stored in the storage unit 120 and assigns a browser when it is determined that no execution result has been stored in the storage unit 120.

'URL=A1' is obtained by loading a state corresponding to 'URL=A' to the assigned browser and applying 'Right' which is a key value to a corresponding screen, and a resultant execution result screen is rendered, captured, and encoded.

The controller 110 may store a combination of (A, Right, A1, and the encoded execution result screen) in the storage unit 120 so that the stored execution result may be directly transmitted to the terminal 200-1 without assigning a browser when the same input is received at a later time.

The controller 110 may assign an application in various manners according to an input from the terminal 200-1.

In a first embodiment of the present invention, the controller 110 may sequentially assign latest-state information and input information received from one or more terminals 200-1 to 200-N to one or more applications.

For example, since the cloud streaming server 100 includes a plurality of browsers, browsers for processing inputs received from the terminals 200-1 to 200-N may be sequentially assigned.

In a second embodiment of the present invention, the controller 110 may assign an application for executing latest-state information and input information received from the terminals 200-1 to 200-N among at least one application on the basis of the latest-state information.

For example, when a URL and a key value are received from the terminal 200-1, the cloud streaming server 100 may assign a browser representing information regarding the URL among at least one browser.

In a third embodiment of the present invention, the controller 110 may arbitrarily assign an application to sequentially apply and execute latest-state information and input information received from the terminals 200-1 to 200-N.

For example, one browser may be arbitrarily assigned to sequentially execute the latest-state information and the input information received from the terminals 200-1 to 200-N.

A method of assigning an application by the controller 110 when an execution result mapped to the latest-state information and the input information is not stored in the storage unit 120 is not limited to the embodiments described above.

Figure 4:
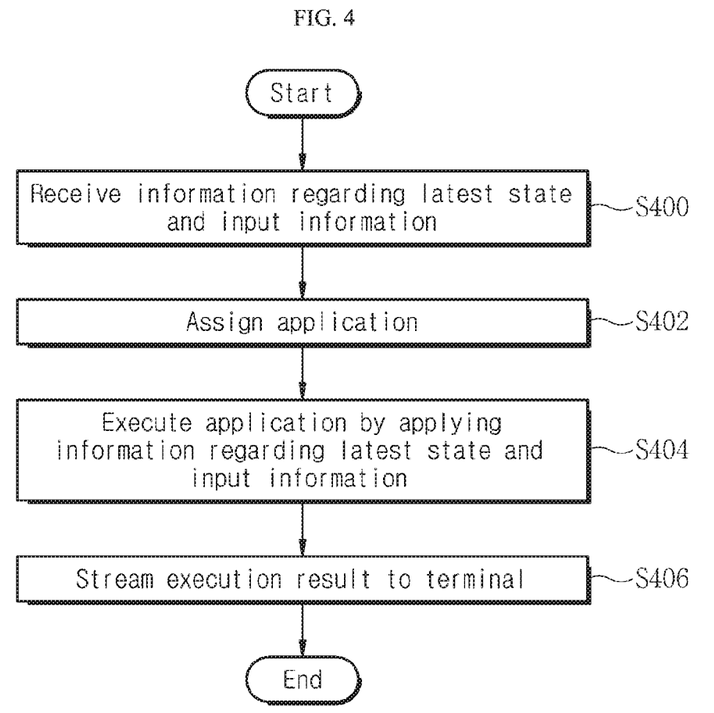
FIG. 4 is a flowchart of a cloud streaming service process according to an embodiment of the present invention.

FIG. 4 is a flowchart of a cloud streaming service process according to an embodiment of the present invention.

Referring to FIG. 4, in a cloud streaming service according to an embodiment of the present invention, the cloud streaming server 100 assigns an application (operation S402) only when latest-state information and input information are received from the terminal 200-1 (operation S400). According to an embodiment of the present invention, an application need not always be executed and is assigned only when an input is received from the terminal 200-1. Thus, a number of terminals to be concurrently supported by the cloud streaming server 100 increases.

The cloud streaming server 100 executes the application by applying the latest-state information and the input information (operation S404), and streams a result of execution of the application to the terminal 200-1 (operation S406).

Figure 5:
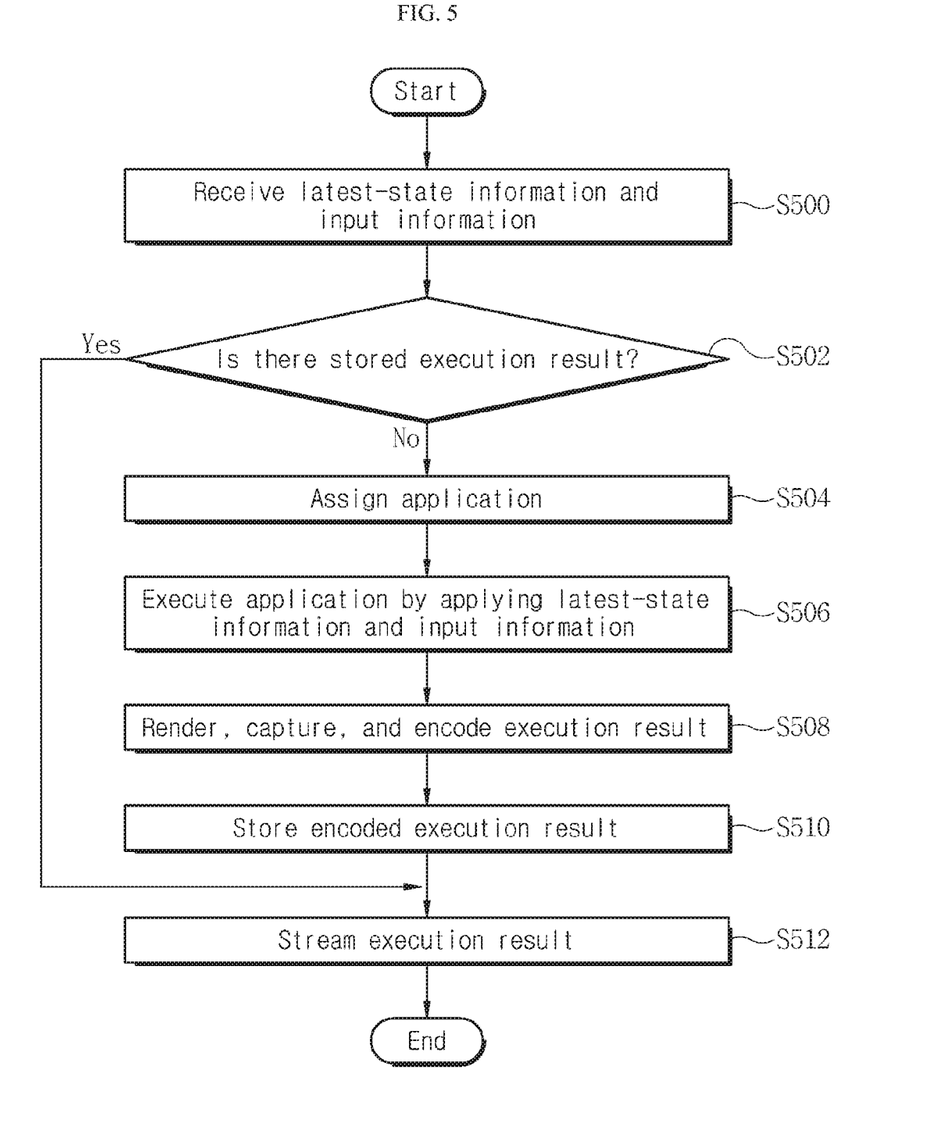
FIG. 5 is a detailed flowchart of a cloud streaming service process according to an embodiment of the present invention.

FIG. 5 is a detailed flowchart of a cloud streaming service process according to an embodiment of the present invention.

The cloud streaming server 100 receives latest-state information and input information from the terminal 200-1 (operation S500). In this case, before an application is assigned, the cloud streaming server 100 determines whether an execution result has been stored in the storage unit 120 (operation S502).

When it is determined that an execution result has been stored in the storage unit 120, the execution result is simply streamed (operation S512).

However, when it is determined that an execution result is not stored in the storage unit 120, the cloud streaming server 100 assigns an application in various manners (operation S504), and executes the application by applying the latest-state information and the input information thereto (operation S506).

The cloud streaming server 100 generates a screen by rendering, capturing, and encoding an execution result screen through the screen generator 130 (operation S508), and stores the encoded execution result in the storage unit 120 (operation S510). The storing of the encoded execution result in the storage unit 120 includes storing the latest-state information and the input information and an execution result therefor by mapping them to one another, as well as the encoded execution result, so that the same execution process may not be repeatedly performed for the same input.

The cloud streaming server 100 streams the execution result to the terminal 200-1 (operation S512).

Figure 6:
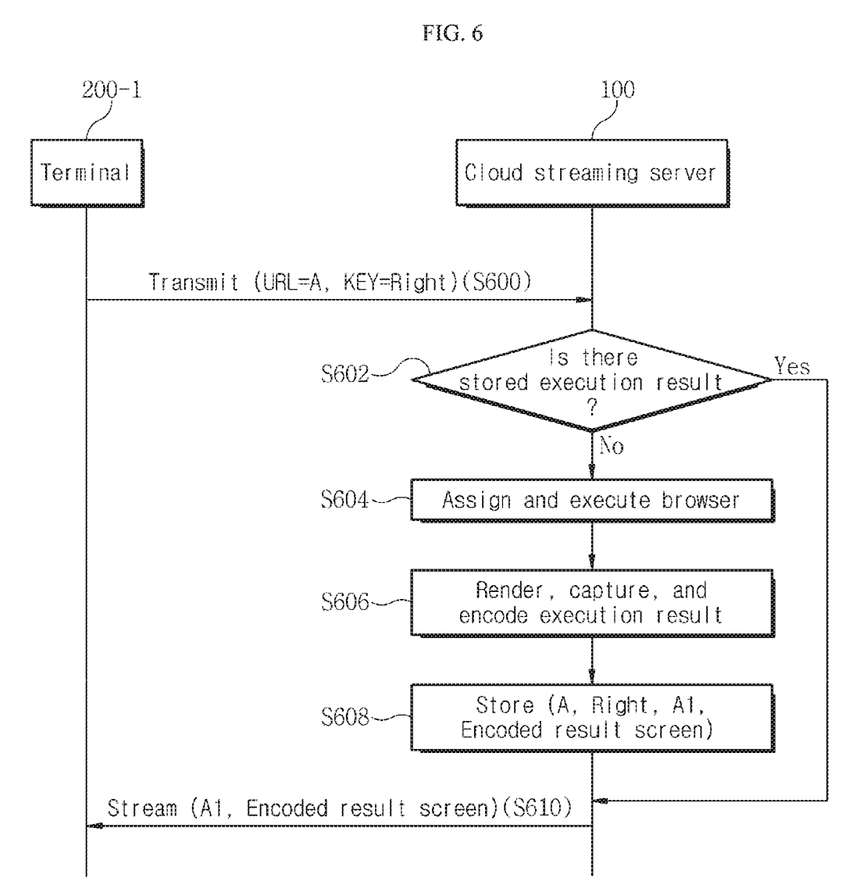
FIG. 6 is a message flow diagram showing a concrete example of a cloud streaming service process according to an embodiment of the present invention.

FIG. 6 is a message flow diagram showing a concrete example of a cloud streaming service process according to an embodiment of the present invention.

When receiving 'URL=A' which is latest-state information and 'KEY=Right' which is input information from a terminal 200-1 (operation S600), a cloud streaming server 100 determines whether an execution result according to the latest-state information and the input information has been stored (operation S602). If an URL of a latest state to which 'URL=A' and 'KEY=Right' are applied is A1, when A1 and an encoded result screen have been mapped and stored in the storage unit 120, A1 and the encoded result screen may be simply streamed to the terminal 200-1 (operation S610).

However, when A1 and the encoded result screen have not been stored in the storage unit 120, a browser is assigned, a corresponding state is loaded by applying 'URL=A' to the browser, and the browser is finally executed by applying 'KEY=Right' in a state in which the corresponding state is loaded (operation S604). Here, the browser may be assigned in various manners. For example, a plurality of browsers may be sequentially assigned to the terminals 200-1 to 200-N, a browser may be assigned on the basis of latest-state information displayed currently in the browser, or one browser may be arbitrarily assigned.

A result screen is generated by rendering, capturing, and encoding an execution result in the browser, and a combination of (A, Right, A1, and the encoded result screen) is stored in the storage unit 120 (operations S606 and S608). After the combination of (A, Right, A1, and the encoded result screen) is stored, the cloud streaming server 100 streams (A1, and the encoded result screen) to the terminal 200-1.

According to the present invention, in a cloud streaming service providing a web browsing service, a number of terminal sessions to be concurrently supported may be increased by assigning a browser only when an input is received from a terminal, and server resources may be efficiently managed by storing an execution result according to the same input in a cloud streaming server to prevent rendering, capturing, and encoding from being repeatedly performed.

In the present disclosure, operations of a method may be performed by at least one programmable processor which executes a computer program to perform functions by executing on-input data and generating an output. Alternatively, the operations of the method may be performed by a special-purpose logic circuit system, e.g., a field programmable gate array (FPGA) or an application-specific integrated circuit (ASIC), and an apparatus may be embodied as the special-purpose logic circuit system.

Examples of a processor appropriate for processing a computer program include a general-purpose microprocessor, a special-purpose microprocessor, and at least one processor of any type of a digital computer. In general, a processor may receive commands and data from one or both of a read-only memory and a random access memory. Elements of a computer may include at least one processor for executing commands and at least one memory device for storing commands and data.

In general, a computer may include at least one large-capacity storage device for storing data, e.g., magneto-optical discs or optical discs, or may be configured to receive data from the at least one large-capacity storage device, transmit data to the at least one large-capacity storage device, or receive data from and transmit data to the at least one large-capacity storage device.

Examples of an information carrier appropriate for embodying computer program commands and data include semiconductor memory devices, e.g., magnetic media, such as a hard disk, a floppy disk, and a magnetic tape, optical media, such as a compact disc-read-only memory (CD-ROM) and a digital video disk (DVD), magneto-optical media, such as a flopitcal disk, a ROM, a random access memory (RAM), a flash memory, an erasable programmable ROM (EPROM), an electrically erasable programmable ROM (EEPROM), etc.

A processor and a memory may be supplemented by or included in a special-purpose logic circuit system.

In the present disclosure, particulars of a plurality of exemplary embodiments are described but the scope of the invention or the scope of maters that can be claimed should not be understood as being limited by the particulars. Rather, the particulars of the embodiments should be understood as features of exemplary embodiments of the invention.

A combination of the specific features described herein in the context of individual embodiments may be embodied in a single embodiment. On the contrary to this, various features described herein in the context of a single embodiment may be also embodied individually or embodied in any appropriate combination of sub-features.

Furthermore, although features may be embodied in a specific combination and described as claimed above at an initial stage, one or more features from the claimed combination may be excluded from the combination in some cases. In this case, the claimed combination may be changed to a sub-combination or a modification of the sub-combination.

Similarly, although it is illustrated in the drawings that operations are performed in a specific order, it should not be understood that the operations should be performed in the specific order or sequentially performed to obtain a desirable result or that all of the operations should be performed.

In a specific case, multitasking and parallel processing may be advantageous. Furthermore, it should not be understood that separation of various system components in the embodiments described above is required in all embodiments. It should be understood that in general, the program component and the systems described above may be integrated into a single software product or packaged in multiple software products.

In the present disclosure, exemplary embodiments of the subject matter of the invention have been described. Other embodiments fall within the scope of the claims to be described below.

For example, even if the operations recited in the claims are performed in a different order, a desirable result may be achieved. For example, the processes illustrated in the appended drawings are not required to be performed in the specific order illustrated in the drawings or to be sequentially performed so as to achieve a desirable result.

The present disclosure suggests optimum modes of the invention, and provides examples to explain the present invention and enable those of ordinary skill in the art to implement and use the present invention. The embodiments set forth in the specification and the drawings are merely examples provided to assist understanding to the invention and should not be understood as limiting the scope of the present invention. It would be apparent to those of ordinary skill in the art that other modified examples based on the technical idea of the present invention may be made.

What is claimed is:

1. A cloud streaming server, comprising:
   memory storing instructions thereon; and
   a processor executing the instructions that cause the processor to:
   assign a plurality of terminals to a plurality of applications,
   receive, from the terminals via a network, latest-state information of the applications executable by the cloud streaming server and input information applicable to the applications,
   determine whether execution results of the applications mapped to the latest-state information with the input information applied are pre-stored in the memory,
   responsive to determining that the mapped execution result is pre-stored in the memory:

retrieve the mapped results pre-stored in the memory without executing the applications on the processor, and send the retrieved results to the terminals as the execution results via the network for display on the terminals;

responsive to determining that the mapped execution results are not pre-stored in the memory:

sequentially launch the applications, place the applications in states as indicated by the latest-stated information, apply the input information to the applications after placing the applications in the states to obtain executed results, and send the executed result to the terminals as the execution result via the network for display on the terminals.

2. The cloud streaming server of claim 1, wherein the applications comprise an application program of loading and executing a web document.

3. The cloud streaming server of claim 1, wherein the processor is further configured to assign the latest-state information and the input information received from the plurality of terminals to the applications.

4. The cloud streaming server of claim 1, wherein the processor is further configured to assign the applications for launching and placing in the states indicated by the latest-state information and applying the input information on the basis of the latest-state information.

5. The cloud streaming server of claim 1, wherein the latest-state information comprises information regarding a uniform resource locator (URL) of a web document; and the input information comprise a key value selected in the web document.

6. A method of providing a cloud streaming service, the method comprising:

assigning a plurality of terminals to a plurality of applications;

receiving, from the terminals via a network, latest-state information of the applications executable by a cloud streaming server and input information applicable to the applications;

determining whether execution results of the applications mapped to the latest-state information with the input information are pre-stored in memory;

responsive to determining that the mapped execution results are pre-stored in the memory:

retrieving the mapped results pre-stored in the memory without executing the applications on a processor of the cloud streaming service, and sending the retrieved result to the terminals as the execution result via the network for display on the terminals;

responsive to determining that the mapped execution results are not pre-stored in the memory:

sequentially launching the applications, placing the applications in states as indicated by the latest-stated information, applying the input information to the applications after placing the applications in the states to obtain executed results, and sending the executed result to the terminals as the execution result via the network for display on the terminals.

7. The method of claim 6, wherein the application comprise an application program of loading and executing a web document.

8. The method of claim 6, further comprising sequentially assigning latest-state information and input information received from the terminals to the applications.

9. The method of claim 6, further comprising assigning the applications for launching and placing in the states as indicated by the latest-state information and applying the input information on the basis of the latest-state information.

10. The method of claim 6, wherein the latest-state information comprises information regarding a uniform resource locator (URL) of a web document, and the input information comprises a key value selected in the web document.

11. A cloud streaming service system comprising:

a cloud streaming server comprising:

memory storing instructions thereon; and a processor executing the instructions that cause the processor to:

assign a plurality of terminals to a plurality of applications, receive, from terminals via a network, a latest-state information of applications executable by the cloud streaming server and input information applicable to the applications, determine whether execution results of the applications mapped to the latest-state information with the input information applied is pre-stored in the memory, responsive to determining that the mapped execution results are pre-stored in the memory:

retrieve the mapped results pre-stored in the memory without executing the applications on the processor, and send the retrieved results to the terminals as the execution results via the network for display on the terminals;

responsive to determining that the mapped execution results are not pre-stored in the memory:

sequentially launch the applications, place the applications in states as indicated by the latest-stated information, apply the input information to the applications after placing the applications in the states to obtain executed results, and send the executed result to the terminals as the execution result via the network for display on the terminals; and the terminals configured to:

transmit, to the cloud streaming server, the input information and the latest-state information, receive the execution results according to the latest-state information and the input information from the cloud streaming server, and display the execution results.

* * * * *